Patented Apr. 17, 1951

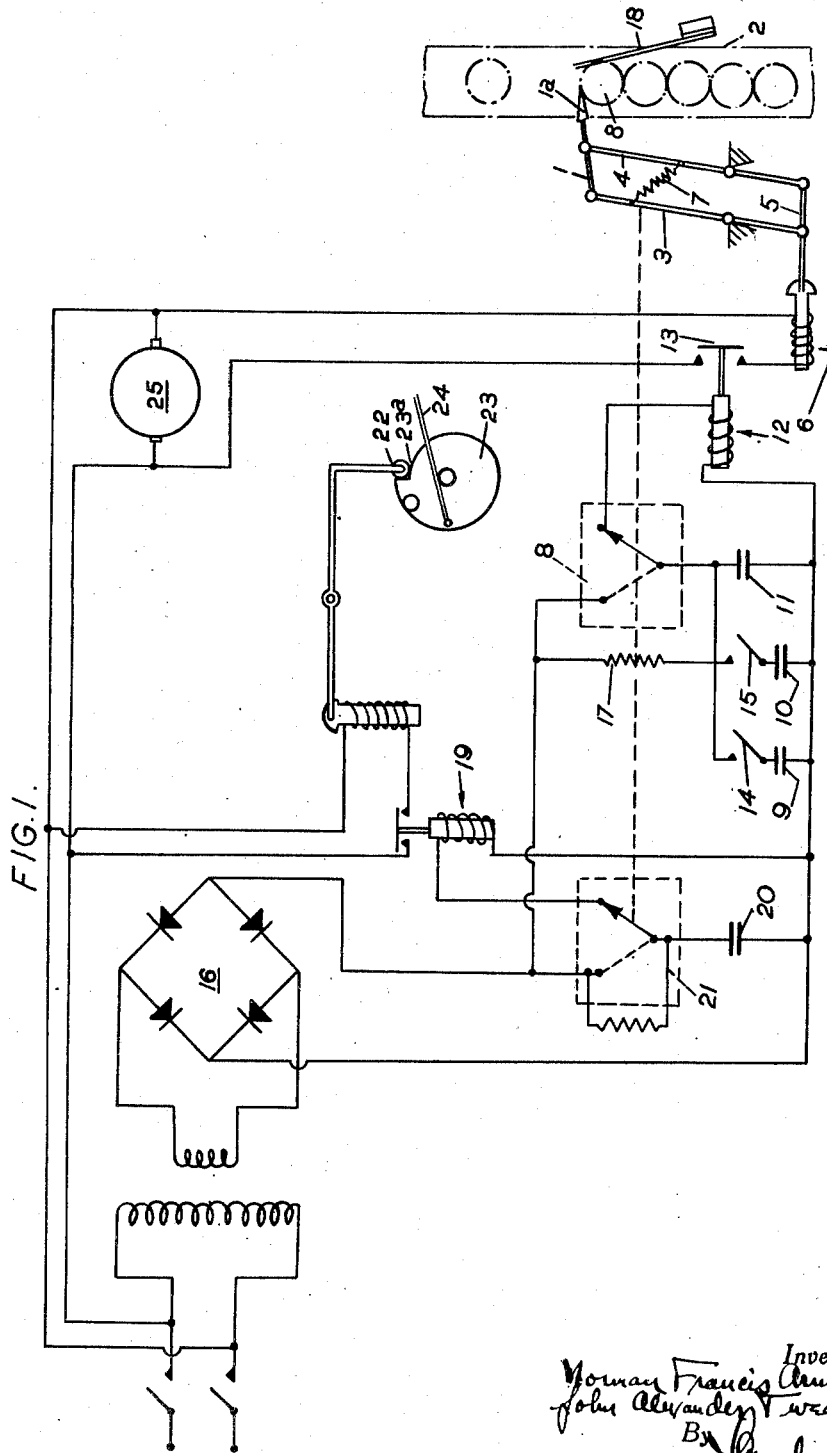

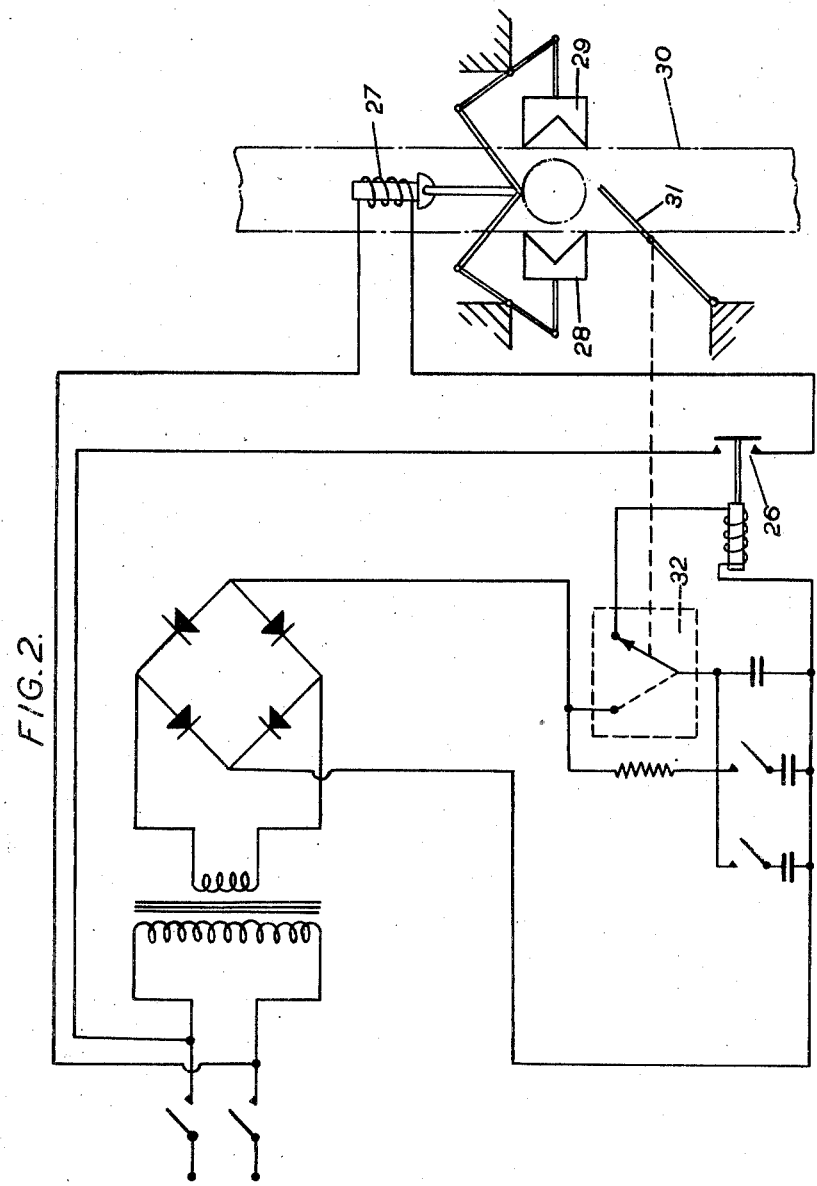

2,549,281

UNITED STATES PATENT OFFICE 2,549,281

ARTICLE SPACING MEANS

Norman Francis Armstrong and John Alexander Tweddell, Newcastle-on-Tyne, England, assignors to The Crown Cork Company Limited, Southall, England Application October 10, 1949, Serial No. 120,498
In Great Britain November 1, 1948

6 Claims. (Cl. 198—34)

This invention consists in an improved device for controlling the passage of a series of articles along a conveyor.

The object of the invention is to provide an improved device for controlling such a series of articles whereby, for example, they may be spaced apart at any desired distance as they move along a conveyor; or individuals of such series held while being operated on to effect some desired result.

According to the invention the device comprises two way switch means operatively connected to tripping means adapted to be actuated by the passage of the articles, and condenser means adapted in one position of the said switch means to be charged, and in the other position to control a solenoid which when energised causes arresting means to be moved into the path of the moving articles and held there, and so arrests their progress until the condenser means have finished discharging, when the solenoid is again deenergised and the arresting means rendered inoperative, and the above cycle repeated for the next article.

For spacing articles the distance apart may be varied by providing a number of condensers in parallel and providing switching means for cutting these in and out, so that by cutting in one or more additional condensers, and so increasing the capacitance, the resistance of the solenoid means remaining unaltered, the magnitude of the discharge may be increased and the length of time increased during which the solenoid is energised, and therefore the length of time increased during which the arresting means are held in the path of the articles.

The invention will now be described by way of example with reference to the accompanying diagrammatic drawings which show two devices.

In the said drawings:

Fig. 1 is a diagrammatic layout of a device for controlling the passage of bottles on the conveyor of a labelling machine in which it is desirable to space a labelled bottle from its oncoming unlabelled neighbour and so prevent congestion.

Fig. 2 is a diagrammatic layout of a positioning device.

Referring more particularly to Fig. 1, 1 is a switch arm arranged for transverse movement over the edge of the conveyor 2, the said arm being slightly obliquely arranged and having a cam portion 1a to promote a cam action between itself and the surface of the passing bottle, so that the latter normally pushes the tripping arm laterally out of the path of the conveyor against the action of a spring. The tripping arm 1 is pivotally connected to the ends of two parallel arms 3, 4 of different lengths, pivotally mounted on the machine frame, the longer being nearer to the conveyor to produce the desired obliquity. The said parallel arms extend beyond their pivoting points and are pivotally connected to a link 5 which at one end is pivotally connected to the end of the plunger of a bottle spacing solenoid 6. A tension spring 7 is diagonally arranged between the parallel arms 3, 4 to hold the cam portion 1a normally over the conveyor 2 when the solenoid 6 is deenergised.

At a point between its pivoting axis and the end connected to the tripping arm, the parallel arm 3 is pivotally connected to two two-way micro switches 8, 21. The microswitch 8 in its normal position is adapted electrically to connect a set of condensers 9, 10, 11 themselves connected in parallel across the coil 12 of a contactor switch 13 controlling the bottle spacing solenoid 6. All but one of the said condensers, that is to say the condensers 9, and 10 are provided with switches 14, 15 for cutting them in and out in order to select the required time constant when they are discharged through the coil 12. In the other position of the microswitch 8 it connects the D. C. terminals of a rectifier 16 or other D. C. source across the said condensers, the contacts of this portion of the microswitch 8 being permanently bridged by a relatively high resistance 17 which while preventing any appreciable current flow from the current source through the solenoid 12 when the switch 8 is in its normal position, ensures the maintenance of the polarity of the condensers 9, 10, 11. This enables the use of electrolytic condensers.

On the side of the conveyor 2 opposite the tripping arm 1, there is an inwardly bent steel leaf spring 18 which is adapted to maintain the bottle on the conveyor against the reaction of the tripping arm as it passes the latter, when this is necessary, for example, in the case of small diameter bottles.

A second contactor switch solenoid 19 is energised from a single condenser 20. This second condenser solenoid circuit has a shorter time constant than the condenser solenoid circuits 9, 10, 11, 13. It is controlled by the microswitch 21 which, as above stated, is also operated by the parallel arm 3, and controls the solenoid circuit of a solenoid operated detent 22 which is adapted to engage a recess 23a in a driving wheel 23 connected by the connecting rod 24 to a horizontally reciprocating label spreader (not shown), the driving wheel 23 being driven through a slipping clutch (not shown) whose driving member is continuously rotating during the operation of the machine.

25 is a motor for driving the labelling machine.

In operation, assume a bottle B is passing the tripping arm 1, it forces it sideways, so that the parallel arms 3, 4 are rocked and the microswitches 8, 21 are moved into the dotted line position in which the respective sets of condensers 9, 10, 11 and 20 are connected across the rectifier 16 and are charged. When the bottle B has passed the tripping arm 1 the microswitches 8, 21 are restored to their normal full line positions and the contactors 13, 19 are energised so that the detent 22 is withdrawn from engagement with the driving wheel 23 and the labelling cycle of operations is recommenced; while the tripping arm is forced by the bottle spacing solenoid 6 into the path of the next bottle. As the detent contactor 19 is energised by a condenser 20 only, the detent solenoid is de-energised first and the detent 22 falls back on to the periphery of the driving wheel 23 in sliding contact with it but as the bottle spacing contactor 13 is energised, by a number of condensers, it is held on longer so that spacing of the bottle takes place.

The parallel arm mechanism has the advantage over a swinging trip arm that the arm 1 is moved transversely across the conveyor so that it may be inserted without difficulty between adjacent contacting bottles, whereas if a swinging trip arm were used it would not be able to return after a bottle had passed, in time to engage the following bottle at the desired arresting point, the latter having in the meantime moved with the released bottle and therefore having taken up a position beyond the arresting point before the trip arm has disengaged from the released bottle. Another advantage is that the pressure of the bottles against the arm 1 does not require a corresponding effort by the solenoid as would be the case if a swinging trip arm were used.

Fig. 2 shows an arrangement which, in addition to spacing, positions articles such as bottles for crown corking or syruping or other operation requiring accurate positioning. According to this arrangement the contactor switch 26 which correspond to the contactor switch 13 of Fig. 1 controls a solenoid 27 whose plunger is operatively connected to two oppositely moving V-blocks 28, 29 which are arranged on opposite sides and so as to be normally clear of the conveyor 30. The bottle trip lever 31 is adapted to actuate a microswitch 32 controlling a condenser circuit similar to that associated with the switch 8 of Fig. 1, which controls the solenoid 27. Hence when a bottle operates the trip lever 31 the V-blocks 28, 29 move towards each other and grip the bottle for an interval of time depending on the number of condensers in use.

We claim:

1. A device for controlling the passage of a series of articles along a conveyor, comprising two way switch means, tripping and arresting means operatively connected to said switch means and adapted to be actuated by the passage of the articles, and to be moved into the path of the articles, a solenoid operatively connected to said tripping and arresting means, and condenser means controlled by said two way switch means so that in one position of said two way switch means said condenser means are charged, and in the other position of said two way switch means said condenser means energises said solenoid to cause it to move said tripping and arresting means into the path of the moving articles and hold it thus until said condenser means have finished discharging when the solenoid is again de-energised and the tripping and arresting means rendered inoperative, and the above cycle repeated for the next article in the series.

2. A device according to claim 1, comprising a plurality of condensers in parallel, and switching means for cutting said condensers in and out, so that by cutting in one or more additional condensers, and so increasing the capacitance, the magnitude of the discharge may be increased and the length of time increased during which the solenoid is energised, and therefore the length of time increased during which the arresting means are held in the path of the articles.

3. A device according to claim 1 wherein the tripping means are also the arresting means.

4. A device according to claim 1 wherein the tripping means are also the arresting means and are adapted to actuate the switching means, two condenser solenoid circuits controlled by said switching means, said circuits having different time constants, the circuit with the larger time constant being adapted to control the passage of articles along the conveyor, and the circuit with the shorter time constant being adapted to control an operation on the article.

5. A device according to claim 1 wherein the tripping and arresting means are separate, the arresting means being adapted to engage an article, a solenoid adapted to operate said arresting means, the switching means being adapted to control said solenoid, so that when the tripping means are operated the arresting means are caused to engage the article for an interval of time depending on the number of condensers in use.

6. A device according to claim 5 wherein the arresting means comprise two V-blocks arranged on opposite sides of and clear of the conveyor, and adapted to move in opposite directions to effect gripping of the article.

NORMAN FRANCIS ARMSTRONG.
JOHN ALEXANDER TWEDDELL.

REFERENCES CITED

The following references are of record in the file of this patent:

UNITED STATES PATENTS

| Number | Name | Date |
| --- | --- | --- |
| 2,134,373 | Parker | Oct. 25, 1938 |
| 2,171,362 | Gulliksen | Aug. 29, 1939 |